Jan. 10, 1956  B. D. LOUGHLIN  2,730,564
FREQUENCY-MODULATION DETECTION SYSTEM
Filed July 11, 1951  3 Sheets-Sheet 1

*INVENTOR.*
BERNARD D. LOUGHLIN
BY Laurence B. Dodds
ATTORNEY

Jan. 10, 1956  B. D. LOUGHLIN  2,730,564
FREQUENCY-MODULATION DETECTION SYSTEM
Filed July 11, 1951  3 Sheets-Sheet 2

INVENTOR.
BERNARD D. LOUGHLIN
BY Laurence B Dodds
ATTORNEY

FIG. 7

INVENTOR.
BERNARD D. LOUGHLIN
BY Laurence B. Dodds
ATTORNEY

United States Patent Office 2,730,564
Patented Jan. 10, 1956

2,730,564

FREQUENCY-MODULATION DETECTION SYSTEM

Bernard D. Loughlin, Lynbrook, N. Y., assignor to Hazeltine Research, Inc., Chicago, Ill., a corporation of Illinois Application July 11, 1951, Serial No. 236,153

8 Claims. (Cl. 178—5.8)

General

The present invention relates to frequency-modulation detection systems, specifically to such systems in which frequency-modulated wave signals are converted to amplitude-modulated wave signals and, particularly, to such systems which have substantially reduced response to undesired amplitude modulation.

Frequency-modulation receivers conventionally include a frequency-modulation detector for deriving the modulation components of a received frequency-modulated wave signal. One form of such detector has a frequency-selective network, which changes the frequency modulation of the received wave signal to amplitude modulation, followed by a rectifier system which is responsive to the amplitude modulation to derive the modulation components of the wave signal. Conventional detectors of this type are inherently amplitude responsive to undesired, spurious amplitude variations of the received wave signal such as those due to atmospheric conditions or electrical disturbances. Even if the frequency detector is of a balanced type, its output is proportional to the degree of frequency modulation and to the instantaneous amplitude of the received wave signal, including any undesired variations thereof. Therefore, such a system frequently is preceded by a limiting system which largely removes the undesired amplitude variations of the received wave signal prior to the application of the latter to the detector.

The use of a separate limiting system with a frequency detector has numerous disadvantages. Among these may be mentioned the increased cost and complexity of the receiver, the fact that additional vacuum tubes are required with attendant increased maintenance troubles and cost, and the increased power required to operate the receiver. Both the prior limiting systems and the conventional frequency detectors usually have additional limitations individual to each relating largely to their design and adjustment to effect the optimum operation desired thereof.

One form of conventional frequency detector is so constructed and operated as to have somewhat reduced response to undesired amplitude variations of a received wave signal without the use of a separate limiter. The ratio detector is of this type and has a frequency-responsive network comprising a tuned primary circuit with one terminal effectively grounded, across which circuit a modulated wave signal is applied. The primary circuit is coupled to a mid-tapped, tuned secondary circuit which is effectively connected at wave-signal frequencies to the ungrounded terminal of the primary circuit, thereby providing wave-signal voltages which, when measured from secondary circuit terminals to ground, are equal respectively to the instantaneous sum and difference of the primary voltage and one-half of the secondary voltage. Due to the phase relationships of the latter voltages, the magnitude of these sum-and-difference output voltages varies in opposite sense with frequency, thus to change the frequency modulation of the applied wave signal to amplitude modulation between each secondary terminal and ground. Individual rectifiers are then used in such a manner as to deliver rectified current proportional to the vector sum of these voltages. This current, passing through a load impedance having a relatively long time constant, provides a relatively constant bias independent of the derived modulation signal, varying only with the mean intensity of the received wave signal while being substantially unresponsive to amplitude variations of the signal. Modulation-signal components derived from the rectifiers are applied to an output circuit of the detector for utilization. Though a detector of the type just described has reduced response to undesirable amplitude variations of a received wave signal, the circuits involved are of such a nature that they must be critically balanced, require very high quality components, and are susceptible to producing wide variations in the quality of detection and amplitude rejection with aging and temperature changes.

In addition to a detector of the type just described, an improved frequency-modulation detector requiring no separate limiting circuits has been described in United States Patent No. 2,498,253, dated February 21, 1950, and entitled "Frequency-Modulation Detector System." The detector described therein utilizes a pair of rectifier networks effectively connected in series with one another across input circuits oppositely detuned from the mean frequency of the applied frequency-modulated signal. The parameters of these rectifier networks are proportioned so that each of the networks is conductive for wave-signal currents but is substantially nonconductive for currents of modulation-signal frequency. As in the ratio-detector arrangement, there is provided in the combined output circuit of the detectors a circuit having a long time constant thereby developing a bias potential which varies only with change in signal intensity. The rectifier networks are further so arranged and proportioned that frequency-modulation signals vary the signal level in the output circuit whereas amplitude-modulation signals produce no such variation. The improvement of a circuit of this type over the ratio-detector circuit described above is found in the arrangement of the rectifier circuits in series across the signal source, thereby causing the current flow in each of the circuits inherently to be equal and balanced. Though a circuit of the type just described is an improvement over the ratio detector arrangement previously described insofar as it does not require high quality or critical components, there may be difficulty in maintaining the desired amount of balance to effect highest quality output free from noise produced by amplitude-modulation signals.

It is an object of the present invention, therefore, to provide a new and improved system for deriving the modulation components of a frequency-modulated wave signal which avoids one or more of the disadvantages and limitations of prior systems.

It is a further object of the invention to provide a system for deriving the modulation components of a frequency-modulated wave signal which possesses over a wide frequency range an excellent linearity characteristic, with comparatively high sensitivity, and which has substantially reduced response to undesired amplitude variations of a frequency-modulated wave signal applied thereto.

It is an additional object of the invention to provide a system for deriving the modulation components of a frequency-modulated wave signal which is of simplified and improved construction characterized by ease and flexibility of adaptation to numerous diverse applications involving widely different operating frequencies.

It is a still further object of the invention to provide a system for deriving the modulation components of a frequency-modulated wave signal which does not require balanced detector circuits or equal current flow in the detector circuits.

In accordance with a particular form of the invention, a system for deriving the modulation components of a frequency-modulated wave signal comprises a circuit for supplying the frequency-modulated wave signal and an impedance network including in series an impedance circuit and a unidirectionally conductive device coupled to the supply circuit the impedance of the network varying with the frequency of the frequency-modulated signal. The detection system also includes a signal generator for developing an unmodulated other wave signal the frequency of which is a minor fraction of the mean frequency of the frequency-modulated signal and also includes a load circuit coupled to the generator and responsive to the other wave signal. The load circuit is effectively coupled in shunt with the impedance network so that the variations in the impedance of the network effect amplitude modulation of the other wave signal in the load circuit corresponding to the frequency modulation of the supplied signal. The system also includes an amplitude detector coupled in circuit with the load circuit and responsive to the amplitude-modulated other wave signal for deriving the modulation components therefrom.

For a better understanding of the present invention, together with other and further objects thereof, reference is had to the following description taken in connection with the accompanying drawings, and its scope will be pointed out in the appended claims.

Referring now to the drawings.

Figure 1:
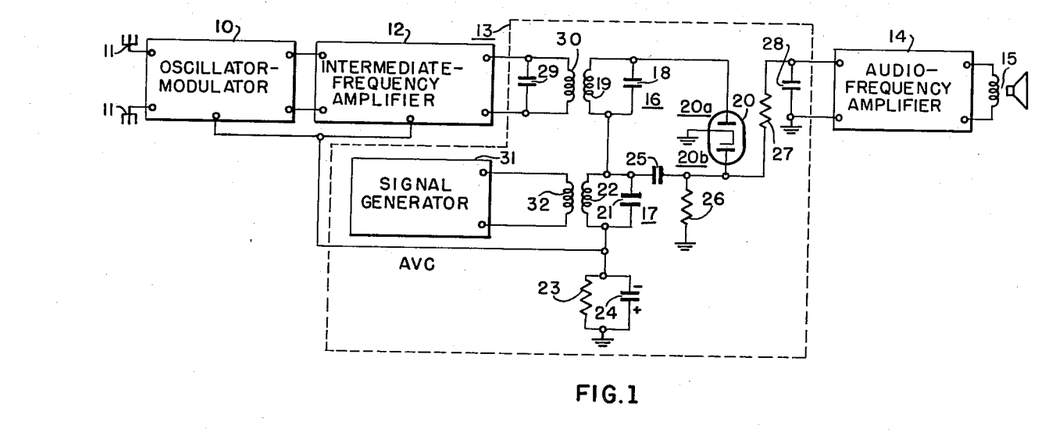
Fig. 1 is a circuit diagram, partly schematic, representing a complete frequency-modulation receiver embodying one form of a system for deriving the modulation components of a frequency-modulated wave signal in accordance with the present invention.

*Description of Fig. 1 frequency-modulation receiver embodying present invention*

Referring more particularly to Fig. 1 of the drawings, there is represented, partly schematically, a complete frequency-modulation receiver embodying one form of a system for deriving the modulation components of a frequency-modulated wave signal in accordance with the teachings of the present invention. This receiver includes an oscillator-modulator 10 having an input circuit coupled to an antenna system 11, 11 and having an output circuit coupled to an input circuit of an intermediate-frequency amplifier 12 of one or more stages. Coupled in cascade to the amplifier 12 is a frequency-modulation detector system 13, more fully described hereinafter, an audio-frequency amplifier 14 of one or more stages and a sound-reproducing device 15. The system 13 is arranged to convert the frequency modulations to amplitude modulations and includes an amplitude detector for deriving the amplitude modulations, as will be described more fully hereinafter. An automatic-volume-control or A. V. C. circuit included as part of the output circuit of the system 13 is coupled to the input circuits of one or more of the tubes of the oscillator-modulator 10 and the intermediate-frequency amplifier 12 in order to maintain the amplitude of the signal input to the system 13 within a relatively narrow range for a relatively wide range of received wave-signal intensities.

It will be understood that the various units just described may, with the exception of the frequency-modulation detector system 13, be of conventional construction and operation, the details of which are known in the art rendering further detailed description thereof unnecessary. Considering briefly the operation of the receiver as a whole, and neglecting for the moment the detailed operation of the frequency-modulation detector system 13 presently to be described, a desired frequency-modulated wave signal is selected by the oscillator-modulator 10, is converted by the latter unit to a frequency-modulated intermediate-frequency wave signal which is applied to and amplified by the intermediate-frequency amplifier 12, and is detected by the frequency-modulation detector system 13, thereby to derive the audio-frequency modulation components of the received wave signal. The audio-frequency components are, in turn, amplified in the audio-frequency amplifier 14 and are reproduced by the sound reproducer 15 in a conventional manner. The automatic-volume-control or A. V. C. bias derived by the detector system 13 is effective to control the amplification of either or both of the units 10 and 12 to maintain the intensity of the signal input to the detector system 13 within a relatively narrow range for a wide range of received wave-signal intensities.

*Description of frequency detector of Fig. 1*

Referring now more particularly to the portion of the receiver embodying the present invention, the system for deriving the modulation components of a frequency-modulated wave signal by converting a frequency-modulated wave signal to an amplitude-modulated wave signal, specifically frequency detector 13, includes a circuit for supplying a frequency-modulated wave signal, specifically a parallel-tuned circuit including an inductor 30 and a condenser 29 coupled to the output circuit of the amplifier 12 for supplying a frequency-modulated intermediate-frequency signal.

The detector 13 also includes an impedance network 16 comprising in series an impedance circuit and a unidirectionally conductive device. The impedance circuit includes a parallel resonant circuit having a condenser 18 and an inductor 19 inductively coupled to the tuned circuit 29, 30 and side-tuned to the mean frequency of the intermediate-frequency signal supplied by the circuit 18, 19 so that changes in the frequency of the intermediate-frequency signal caused by the frequency modulation thereof cause the impedance of the impedance network to change. The unidirectionally conductive device comprises a diode rectifier 20a, being one-half of a vacuum tube 20, coupled between one terminal of circuit 18, 19 and ground.

The detector system 13 also includes a signal generator, specifically the generator 31 having an output circuit including an inductor 32, for developing an unmodulated other wave signal the frequency of which is a minor fraction of the mean frequency of the frequency-modulated signal. For example, the frequency of the other wave signal may be of the order of 100,000 cycles or a super-audible frequency.

The detector system 13 also includes a load circuit coupled to the generator 31 and responsive to the other wave signal and effectively coupled in shunt with the network 16 so that the changes in the impedance of the network 16 effect amplitude modulation of the other wave signal in the load circuit corresponding to such frequency modulation. The load circuit includes a parallel-resonant or tuned circuit comprising a condenser 21 and an inductor 22 conductively connected to one terminal of circuit 18, 19 and through the parallel-connected network of a resistor 23 and a condenser 24 to ground. The inductor 22 is inductively coupled to the inductor 32 and the circuit 21, 22 is resonant at the frequency of the other wave signal. The resistor 23 and the condenser 24 form a time-constant network responsive to average variations in received wave-signal intensity but substantially unresponsive to instantaneous amplitude variations in the received frequency-modulated wave signal. The network 23, 24 is also adapted to provide the A. V. C. voltages to the oscillator-modulator 10 and the intermediate-frequency amplifier 12.

The detector 13 additionally includes an amplitude detector coupled in parallel with the load circuit including the network 17 and responsive to the amplitude-modulated wave signal effectively developed in the load circuit, in a manner to be described more fully hereinafter, to derive the modulation components therefrom. Specifically the unit 13 includes a diode detector 20b, comprising the other half of the tube 20, having the anode circuit thereof, including a load resistor 26 coupled through a condenser 25 to the network 17. The output circuit of the detector 20b includes a by-pass condenser 28 for carrier-frequency signals coupled across the input circuit of amplifier 14 and connected through a resistor 27 to the anode of tube 20b.

*Operation of the frequency detector of Fig. 1*

The operation of the frequency-detector system 13 just described will now be considered with reference to Figs. 2–5, inclusive. Figs. 2–5, inclusive, are circuit diagrams of simplified detector networks which are useful in explaining the invention and are therefore considered at this time for the purpose of explaining the theory of the invention in a step-by-step manner.

Before proceeding to the discussion of these figures it might be well to mention that in the circuits of Figs. 1–5, inclusive, and 7, and the graphs of Figs. 2a–2c, 3a, 3b, 4a and 6 similar circuit elements or curves are designated by the same reference characters and analogous elements or curves by the same reference characters primed. Also, in discussing the graph of Fig. 2a and other graphs hereinafter, voltages and currents related to an element of a circuit will be designated respectively by the letters E and I and will include a subscript comprising the reference number of the element. Thus in Fig. 2a, to be considered hereinafter, $E_{35}$ refers to the voltage across resistor 35 of Fig. 2 and $I_{35}$ refers to the current therethrough.

Figure 2:
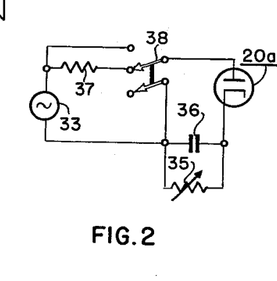
Figs. 2, 3, 4, and 5 are circuit diagrams of simplified detector networks useful in explaining the operation of the invention.

Fig. 2 is a simplified schematic diagram of a frequency-modulation detector of a basic type having a generator 33 of unmodulated voltage of peak amplitude E and having internal impedance Z at a carrier frequency $f_c$ but having negligible direct-current resistance. The impedance Z at the frequency $f_c$ is represented by resistor 37 shown as being connected through a switch 38 in series with the generator 33 and the anode of the diode 20a. Since the generator 33 will be considered hereinafter as being either a constant voltage or a constant current source, the conventional designation of the internal impedance, as represented by the resistor 37, in series with the generator 33 indicates a constant voltage source and when in parallel indicates a constant current source. The switch is merely a symbolic device for representing the relation of the internal impedance represented by the resistor 37 as being either in series or parallel with the generator 33 to indicate the generator as a constant current or constant voltage source. Signals emanating from this generator are applied to the diode 20a, which has a variable direct-current load circuit comprising a variable resistor 35 connected in series with the generator 33 and the cathode of the tube 20a. The resistor 35 is shunted by a condenser 36 which serves to by-pass all signals of carrier frequency $f_c$.

Figure 2A:
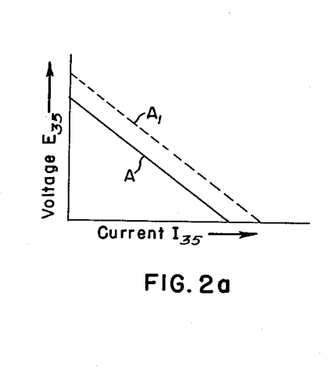
Figs. 2a–2c, 3a, 3b and 4a are graphs useful in explaining the operation of the networks of Figs. 2, 3, and 4.

The operation of this circuit when the generator 33 is a constant voltage source and thus the impedance Z of the generator as represented by the resistor 37 is in series with the diode 20a as best understood by reference to Fig. 2a. Fig. 2a shows a graph of the regulation curves of the detector, having co-ordinates of direct current and voltage with relation to the load resistor 35. As the value of the direct-current load resistor 35 is varied, since the voltage applied by the generator 33 is constant, the values of $E_{35}$ and $I_{35}$ will vary as shown by the regulation curve A. When the value of the resistor 35 is increased, the voltage $E_{35}$ increases and the current $I_{35}$ decreases. The converse occurs as the value of the resistor 35 is decreased.

The principal points of interest of the curves of Fig. 2a are the points defining open-circuit conditions and short-circuit conditions of the resistor 35 with respect to the current through the diode 20a. It will be evident that on open-circuit conditions, that is when there is a substantially infinite resistance in the resistor 35, the voltage $E_{35}$ will be a finite maximum and minimum current will be drawn through the diode 20a. On short-circuit conditions, the value for the resistor 35 being zero, the voltage $E_{35}$ will be a finite minimum and a maximum current will be drawn through the diode 20a, other circuit values remaining constant. These points of maximum current and voltage are experimentally determinable in a circuit such as that of Fig. 2 and indicate that the unidirectional load resistor 35 is actually in parallel with a low-frequency impedance network comprising the diode 20a and the generator 33 with its internal high-frequency 37. If it is assumed that the diode 20a is 100 per cent efficient, that is, that there are no energy losses therein, the value of the maximum current $I_{35}$ and maximum voltage $E_{35}$, under the conditions just described, depends solely on the impedance Z of the generator 33 as represented by the resistor 37 and the voltage developed by the generator 33. This relationship can be proven mathematically.

If the diode 20a is a 100 per cent efficient peak detector, the peak alternating voltage $e_{ac}$ developed by the generator 33 at a fixed frequency $f_c$ across the series circuit of the diode 20a and the condenser 36 and the peak unidirectional voltage $E_{35}$ across the resistor 35 will have the following relationship:

$$e_{ac} = E_{35} \tag{1}$$

Also, it is an established fact that, in a circuit of the type under consideration, the peak alternating current $i_{ac}$ in the circuit including the elements 33, 36 and 20a has the following relationship to the unidirectional current $I_{35}$ flowing in the circuit including the resistor 35:

$$i_{ac} = 2I_{35} \tag{2}$$

The peak alternating voltage $e_0$ developed solely across the generator 33 at the fixed frequency $f_c$ is related to the current $i_{ac}$, due to the energy loss in the impedance represented by the resistor 37, as follows:

$$i_{ac} = \frac{e_0 - e_{ac}}{R_{37}}$$

where $R_{37}$ is the internal impedance in ohms of the generator 33 at the frequency $f_c$.

By utilizing the relationships of Equations (1)–(3), inclusive, it is apparent that:

$$(2R_{37})(I_{35}) = e_0 - E_{35} \tag{4}$$

In order to determine the low-frequency impedance $Z_A$ of the generator 33 having the internal high-frequency impedance represented by the resistor 37, two levels of the unidirectional potential $E_{35}$ may be assumed, that is, $(E_{35})k$ and $(E_{35})K$ and the unidirectional current $(I_{35})m$ and $(I_{35})M$ corresponding to these levels where $k$, $K$, $m$ and $M$ are constants. The impedance $Z_A$ may then be calculated as follows by using Equation (4):

$$2R_{37}(I_{35})m = e_0 - (E_{35})k \tag{5}$$

and $$2R_{37}(I_{35})M = e_0 - (E_{35})K \tag{6}$$

Combining Equations (5) and (6) and simplifying, the following equation is obtained:

$$2R_{37}(MI_{35} - mI_{35}) = kE_{35} - KE_{35} \tag{7}$$

Since the unidirectional current $I_{35}$ increases when the unidirectional voltage $E_{35}$ decreases, these parameters always varying in opposing directions, the low-frequency impedance $Z_\Delta$ of the generator 33 having the internal high-frequency impedance $R_{37}$ may be defined as follows:

$$Z_\Delta = \frac{kE_{35} - KE_{35}}{MI_{35} - mI_{35}} \quad (8)$$

which is recognizable as an impedance $Z_\Delta$ defined by a change in voltage divided by a corresponding change in current. Finally, utilizing the relationships expressed in Equation (7) to solve Equation (8), the following equation is obtained:

$$Z_\Delta = \frac{kE_{35} - KE_{35}}{kE_{35} - KE_{35}} 2R_{37} \quad (9)$$

The latter equation reduces to:

$$Z_\Delta = 2R_{37} \quad (10)$$

Equation (10) is a mathematical expression of the previous statement that, if it is assumed that the diode $20a$ is 100 per cent. efficient, the value of the maximum current $I_{35}$ and maximum voltage $E_{35}$ depends solely on the impedance Z of the generator 33 as represented by the resistor 37 and the voltage developed by the generator 33. In other words, the low-frequency impedance $Z_\Delta$ of the circuit including the diode $20a$ and the generator 33 with its internal impedance as represented by the resistor 37 is proportional to the high-frequency impedance Z of the generator 33, specifically, is equal to twice such impedance.

Referring again to Fig. 2a, since as defined by Equation (10) the low-frequency impedance $Z_\Delta$, represented by curve A, is equal to twice the high-frequency impedance Z, the slope of curve A is approximately $-2Z$. In view of the fact that the value of the impedance Z determines the slope of the curve A, any increase in the voltage generated by the generator 33, the impedance Z remaining constant, will result in a new curve $A_1$, having the same slope as curve A but being positioned parallel thereto, defining the $E_{35}$—$I_{35}$ conditions of the circuit. It is therefore evident that as the intensity of the signal produced in the generator 33 or the intensity of a carrier signal equivalent thereto changes, the impedance Z remaining constant, parallel-disposed curves of the type A and $A_1$ become the characteristic curves of the voltage-current conditions across the load resistor 35.

Figure 2B:
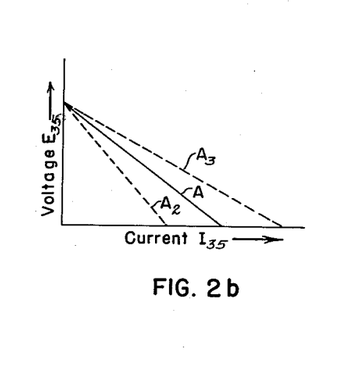
Figure 2C:
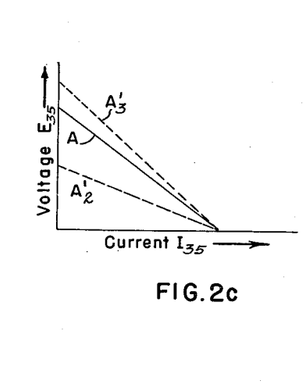

Referring now to the graph of Fig. 2b, which graph has co-ordinates similar to those of Fig. 2a, curve A is again shown and it is again assumed that the generator 33 is a constant voltage source. As was shown above with respect to Fig. 2a, the maximum values of voltage $E_{35}$ and current $I_{35}$ depend only on the value of the impedance Z of the generator 33. Therefore, changes in the value of the impedance Z as represented by the resistor 37 produce changes in the slope of the regulation curves. Thus, if the frequency of the signal generated by the generator 33 varies, the generated voltage remaining constant, the impedance Z will vary and curves of the type $A_2$ and $A_3$ will be obtained for signals having frequencies above and below the frequency $f_c$. Under the constant voltage conditions just described, the low-frequency impedance Z of the circuit including the diode $20a$ and the generator 33 having a high-frequency internal impedance Z is determined by the effect of the change in the frequency of the generator 33 on the high-frequency impedance Z of the generator. In other words, as the value of the high-frequency impedance Z changes with the frequency of the applied signal, in accordance with Equation (10) the low-frequency impedance $Z_\Delta$ also changes causing low-frequency load lines such as represented by curves $A_2$ and $A_3$ to be developed. Similarly, if the circuit of Fig. 2 is arranged so that the generator 33 develops constant current regardless of changes in the internal high-frequency impedance of generator 33, as represented by positioning the contacts of the switch 38 so that the impedance Z as represented by the resistor 37 is in parallel with the generator 33, curves of the type shown in Fig. 2c will be obtained. If the generated current remains constant and the frequency varies, the slope of the low-frequency load line as represented by the different curves varies in accordance with changes in the frequency to develop voltage variations related thereto.

Figure 3:
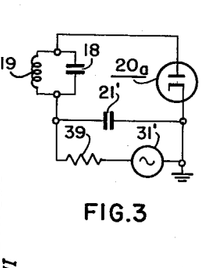
Figure 3A:
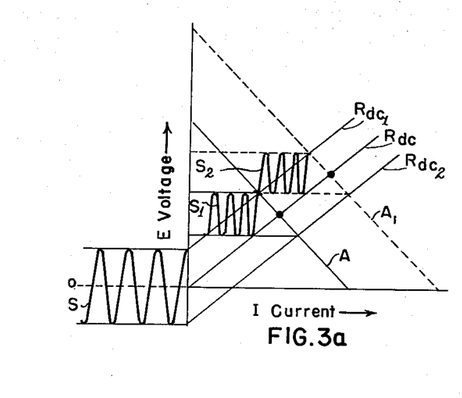

Fig. 3 represents another simplified circuit of a frequency-detector system in which the generator 33 of Fig. 2 is replaced by a parallel-resonant circuit 18, 19 similar to that of Fig. 1 and which includes a new load circuit comprising a series-connected generator 31' and a resistor 39 connected in parallel circuit with a condenser 21'. The generator 31' develops a low-frequency signal, preferably below 100,000 cycles, so that the condenser 21' is a high impedance therefor though this condenser is a by-pass path for the carrier-frequency signal developed in the circuit 18, 19. Fig. 3a, having similar coordinates to Fig. 2a, is useful in explaining the Fig. 3 circuit. The curves $R_{dc}$, $R_{dc_1}$ and $R_{dc_2}$ define the load characteristics of the detector circuit including the tube $20a$ and the resistor 39 for different voltage values of the signal developed in generator 31'. The curve $R_{dc}$ defines these load characteristics when it is assumed that generator 31' is short circuited. The curves $R_{dc_1}$ and $R_{dc_2}$ define the load characteristics, respectively, at the times of the positive and negative maximum values of the signal S developed in generator 31'.

Since the regulation of the detector system including rectifier $20a$ is defined by curve A of Fig. 3a and is determined by the direct-current voltages E and currents I passing through the resistor 39 for different values of the resistor and the curve $R_{dc}$ is also defined by the same voltage and current relationships for different values of the applied signal, the point of intersection of these curves becomes the operating point for the detector system. This point is determined by the low-frequency impedance $Z_\Delta$ and the value of the resistor 39 to define the slope of the load line represented by curve A and by the signal level of the carrier-wave signal to determine the point of intersection of curve $R_{dc}$ with curve A. The intersection of curves $R_{dc}$ and A defines one operating point of the system for carrier-wave signals of one intensity and the intersection of curves $R_{dc}$ and $A_1$ defines another operating point of the system for carrier-wave signals of greater intensity. As shown, the points of intersection of curves $R_{dc_1}$ and $R_{dc_2}$ with the voltage co-ordinate axis, respectively, define the maximum positive and negative excursions of signal S. Similarly the points of intersection of these same curves with the curve A define the amplitude limits of the output signal and the projection of the portion of curve A between these intersecting points onto the voltage axis provides a measure of the maximum positive and negative excursions of the output signal. Such an output signal is represented as $S_1$. In a similar manner the intersection of the curves $R_{dc_1}$ and $R_{dc_2}$ with curve $A_1$ defines the output signal represented as $S_2$. The amplitudes of the signals $S_1$ and $S_2$ are measured from the junction of the condenser 21' and the resistor 39 to ground. It is to be noted with respect to the signals $S_1$ and $S_2$ that the displacement of curve $A_1$ from curve A, produced by a change in the amplitude of the carrier-wave signal applied to network 18, 19, produces no relative change in the amplitudes of the locally developed signals represented by these wave forms. Therefore, the system represented by Fig. 3 is seen to be immune to amplitude variations of the incoming signal applied to network 18, 19.

Figure 3B:
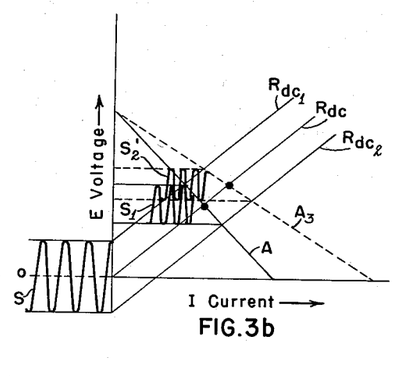

Referring now to Fig. 3b, this figure being similar to Fig. 3a except for the addition of curve $A_3$ similar to curve $A_3$ of Fig. 2b, the response of a frequency-detector system of the type shown in Fig. 3 to variations in frequency of the signal applied to the network 18,

19 may now be explained. The operating point of the circuit of Fig. 3 as defined by curves $R_{dc}$ and A is effective to produce an output signal $S_1$ similar to the signal $S_1$ represented in Fig. 3a, when an input signal S is developed by generator 31'. If now, because of a change in impedance in network 18, 19 produced by a change in frequency of the signal applied thereto, the characteristic curve of the system takes the form of the curve $A_3$, then the operating point of the system is defined by the intersection of curves $A_3$ and $R_{dc}$ and the output signal is $S_2'$. It becomes obvious that the change in the slope of the regulation characteristic curve of the system from that of curve A to that of curve $A_3$, brought about by a change in the frequency of the signal applied to network 18, 19, effects an amplitude modulation of the locally generated signal S to produce the output signal $S_2'$.

To summarize, Figs. 3a and 3b graphically indicate that a system of the type shown in Fig. 3 is responsive to frequency variations in the signal applied to network 18, 19, the signal locally generated in generator 31' being amplitude modulated in accordance with these frequency variations, but is substantially unresponsive to amplitude variations of the signal applied to network 18, 19, such amplitude variations affecting no modulation of the signal generated by generator 31'. It is apparent that the amplitude modulation of the signal developed in the generator 31' is affected by the variation in the value of the low-frequency load impedance $Z_A$ of this generator caused by the variation in the high-frequency impedance of the network 18, 19, by the change in frequency of the carrier-wave signals applied thereto. The relationship defined by Equation 10 is utilized to effect amplitude modulation of the signal developed in the generator 31' in accordance with the frequency modulation of the carrier-wave signal.

Figure 4:
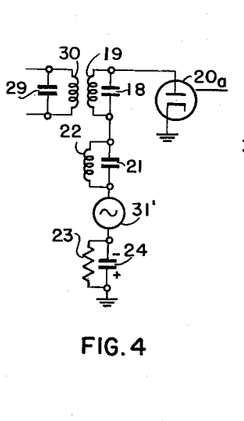

The circuit of Fig. 3, though useful in explaining the invention, might introduce many problems if used as a frequency detector in a frequency-modulation receiver. Therefore, a circuit of the type shown in Fig. 4 is considered more desirable. The circuit of Fig. 4 is similar to the circuit of Fig. 3 except that the load resistor 39 of Fig. 3 has been replaced by an impedance which is effectively responsive only to low-frequency alternating currents, in particular the tuned circuit including the inductor 22 and the condenser 21 resonant at the frequency of generator 31'. In addition a direct-current bias or operating level, at some point other than ground potential, has been effected by the addition of a time-constant network and direct-current load circuit 23, 24. This direct-current bias is made the reference level for the signal produced by generator 31'. It will also be noted that the circuit of Fig. 4 is essentially the same as the circuit of detector 13 of Fig. 1. Therefore, the explanation given with reference to Fig. 4 applies equally well to the circuit of unit 13. The graph of Fig. 4a is useful in explaining the operation of the circuit of Fig. 4.

Figure 4A:
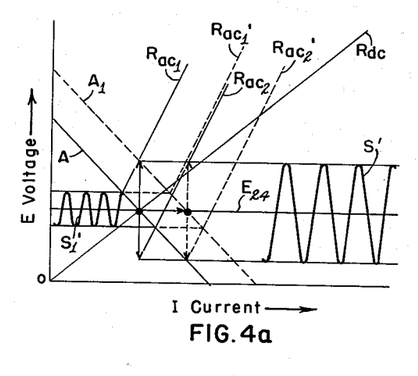

In Fig. 4a, the potential level established by network 23, 24 is designated by line $E_{24}$. As has previously been stated, due to the time-constant characteristics of the direct-current load network 23, 24, this level does not vary with instantaneous changes in signal amplitude but varies only with changes in the average intensity of the signal. The intersection of the curve $R_{dc}$, the direct-current load line, and curve A at the level $E_{24}$ defines the operating point of the system for dynamic or instantaneous operation. When the average intensity of the signal applied to network 18, 19 changes, the level $E_{24}$ will change and the operating point will move along the curve $R_{dc}$, whereas dynamic or instantaneous changes in signal amplitude will not produce such an effect.

In addition to the direct-current load characteristic of the circuit, as determined by network 23, 24, the alternating-current load characteristic of the circuit, as determined by network 21, 22, is now defined by curves $R_{ac_1}$ and $R_{ac_2}$ which may have different slopes than the slope of the resistance curve $R_{dc}$. The signal developed by the generator 31' is represented as $S'$, the extreme variations of which determine the positions of curves $R_{ac_1}$ and $R_{ac_2}$. The positions of these curves in conjunction with the operating point of the system and their relative positions along curve A define the amplitude characteristics of the output signal $S_1'$ as measured from the junction of circuits 18, 19 and 21, 22 to ground. If, during dynamic operation of the detector system, the amplitude of the signal applied to network 18, 19 of Fig. 4 varies so that momentarily the curve $A_1$ defines the operating characteristics of the system, then the level $E_{24}$, being affected only by changes in the average intensity of the signal, remains constant and the operating point of the system momentarily becomes the point of intersection of $E_{24}$ and curve $A_1$. New alternating-current resistance curves $R_{ac_1}'$ and $R_{ac_2}'$ parallel to resistance curves $R_{ac_1}$ and $R_{ac_2}$ will then define the alternating-current operation limits of network 21, 22. It is to be noted that, in spite of the shift in amplitude producing a momentary change in the characteristic curve from A to $A_1$, the operating point is maintained at the same direct-current level $E_{24}$ and the output signal is still $S_1'$. Also, the output signal $S_1'$ does not vary in amplitude as instantaneous changes in the amplitude of the signals applied to circuit 18, 19 occur. Therefore, the system is immune to variations in the amplitude of the output signal corresponding to instantaneous amplitude variations of the signal applied to network 18, 19.

For purposes of simplicity, Fig. 4a does not show the effect of an instantaneous change in the slope of the curve A, produced by a change in the frequency of the signal applied to circuit 18, 19. The effect of such a change on the operational characteristics of the circuit of Fig. 4 may be understood by reference to Fig. 3b by assuming that the curve $A_3$ is plotted as part of Fig. 4a. As previously described, the change in slope from curve A to curve $A_3$, brought about by a change in the frequency of the signal in circuit 18, 19, produces a change in the amplitude of the signal developed by generator 31' across the network 21, 22 to ground so that a signal $S_2'$ (Fig. 3b) is produced as an output signal rather than a signal $S_1$. The change in the slope of the characteristic curve effectively causes an amplitude modulation of the signal developed by the generator 31' in the circuit 21, 22 and effects a corresponding change in the amplitude of the output signal $S_1'$. This change in amplitude is caused by the new positions at which load lines $R_{ac_1}$ and $R_{ac_2}$, or $R_{ac_1}'$ and $R_{ac_2}'$ would intersect, respectively, the curves A or $A_1$ having different slopes. It is evident that, as the slopes of either curves A or $A_1$ change, the projection of the portion of the curve A or $A_1$ intersected by the A.-C. load lines on the voltage co-ordinate line will be large or small thereby effecting an increase or decrease in the amplitude of the signal $S_1'$.

As has been previously stated, the arrangement of the frequency detector 13 of Fig. 1 is essentially the same as that of Fig. 4 and therefore operates in the same manner as the Fig. 4 arrangement. Generator 31 develops a carrier-wave signal of constant frequency which is coupled to resonant tuned circuit 21, 22. Frequency-modulated, intermediate-frequency signals are applied to circuit 18, 19 which is tuned to one side of the mean frequency of the intermediate-frequency signals so as to cause the impedance of the circuit 18, 19 to vary with variations in the frequency of the applied frequency-modulated signal. Frequency changes in the signals applied to the network 16 produce impedance changes therein in the manner described above with reference to Figs. 3 and 4. The network 16 offers an impedance effectively in parallel with the impedance of the network 17 for the low-frequency signals developed by the generator 31. These parallel impedances comprise the load circuit for the generator 31 and the changes in the impedance of the network 16 for the signals from the generator 31 effectively cause an amplitude modulation of the carrier-wave signals in circuit 21, 22. Detector 20b derives the modulation signal of the amplitude-modulated wave signal and applies it to the amplifier 14. Time-constant network 23, 24 provides a direct-current bias for use as the operating level of the detector system 13 and also provides a source of A. V. C. voltage.

Figure 5:
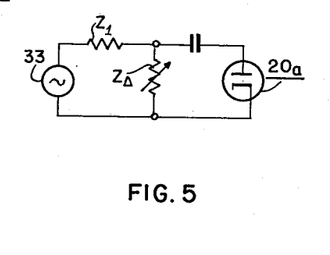

In view of the above explanation, it is apparent that, when a 100 per cent efficient diode is assumed, the impedance $Z_\Delta$ as viewed from diode 20a is independent of $e_o$ and depends only upon $R_{37}$, the impedance of the generator 33 at the frequency $f_c$. Fig. 5 represents such a circuit where $Z_\Delta$ varies with frequency but is independent of the amplitude of the applied signal. A circuit of this type may be substantially obtained by utilizing a high efficiency diode operating at high signal levels, that is at levels in excess of one volt.

In the foregoing analysis of the operation of the detector system 13, it was assumed that the rectifier 20a was 100 per cent efficient and that the impedances in circuits 18, 19 and 21, 22 were completely free of direct-current resistance, having characteristics such that they varied in relative magnitudes with variations in the frequency of the applied signal remaining resistive with the frequency deviation thereof. It is known that available diodes have characteristics which only approach the above characteristics. It is also known that available impedance networks usually have reactive components which vary in magnitude with the frequency deviation of an applied frequency-modulated wave signal. A study of these deficiencies in available diodes and impedance networks indicates that they may be arranged substantially to compensate for each other.

Figure 6:
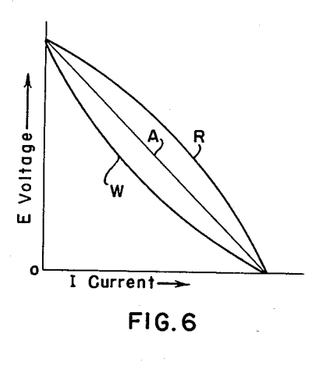
Fig. 6 is an additional graph which represents operational characteristics of selected rectifiers and impedances.

Referring to Fig. 6 of the drawings, the graph of this figure having similar co-ordinates to the graph of Fig. 2a and similar curves being designated by the same reference letters, it can be shown that variations in the operating characteristics of the rectifier and the impedance networks from the type just described may be made to compensate for each other by proper selection of these elements. Thus in Fig. 6, curve A may represent a desired characteristic curve, though linearity of such curve is not always necessary for satisfactory operation. Curves R and W represent the regulation characteristic curves in a diode circuit similar to that of Fig. 2, curve W representing the characteristic of a diode circuit when a signal is applied thereto from a generator having a resistive component and when a diode of less than 100 per cent efficiency is employed and curve R represents the characteristic of a 100 per cent efficient diode circuit to which a signal is applied from a generator having a reactive component. It is immediately evident that the deviations of these two types of circuits are opposite in nature tending to compensate for one another. Therefore, by proper selection of diodes and impedance-network components, it is possible to produce any desired resultant operation characteristic as close to the type of characteristic defined by curve A as is required for satisfactory operation. Therefore, a 100 per cent efficient diode and impedance networks of the type previously described are not essential to the satisfactory operation of a system constructed in accordance with the teaching of the present invention.

Figure 7:
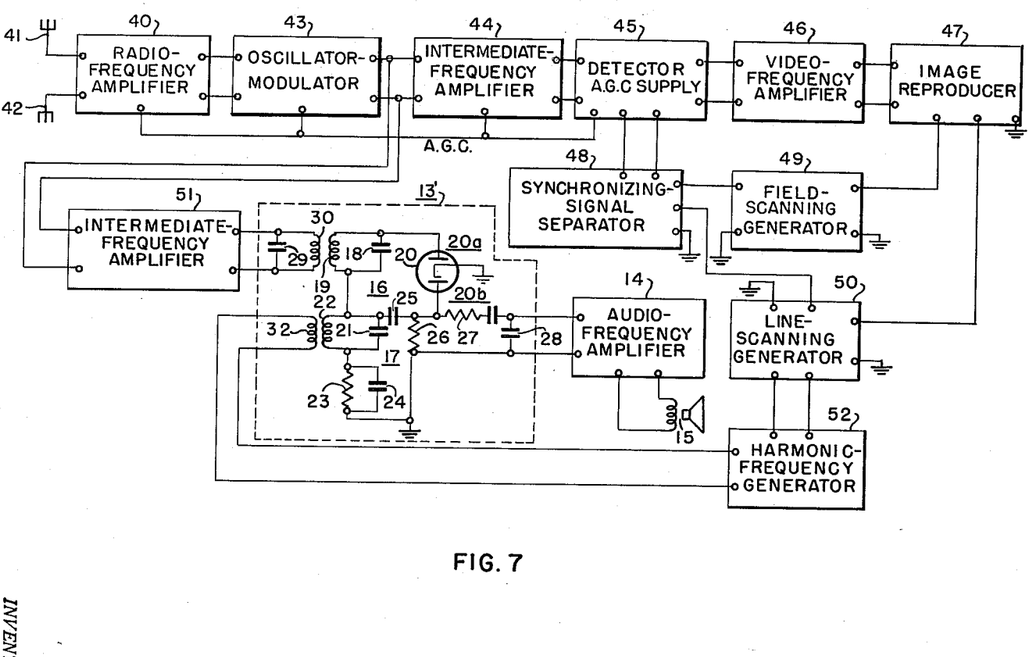
Fig. 7 is a circuit diagram, partly schematic, of a television receiver embodying another form of a system for deriving frequency-modulation components of a frequency-modulated wave signal in accordance with the present invention.

*Description of television receiver embodying the present invention*

Referring now to Fig. 7, there is represented a television receiver embodying a system for converting frequency-modulated wave signals to amplitude-modulated wave signals in accordance with the present invention. With reference to the relationship between Fig. 7 and Fig. 1, similar reference components are designated by the same reference numerals and analogous components by similar reference numerals primed. This receiver includes a radio-frequency amplifier 40 of any desired number of stages having its input circuits coupled to antenna system 41, 42. Coupled in cascade with the output circuit of the amplifier 40, in the order named, are an oscillator-modulator 43, an intermediate-frequency amplifier 44 of one or more stages, a detector and automatic-gain-control or A. G. C. supply 45, a video-frequency amplifier 46 of one or more stages and an image-reproducer 47. There is also coupled to detector 45 a synchronizing-signal separator 48, having output circuits connected to a field-scanning generator 49 and a line-scanning generator 50. The output circuits of field-scanning generator 49 and line-scanning generator 50, respectively, are connected to the deflection controls in image reproducer 47. The output circuit of the A. G. C. supply included in detector 45 is connected to the input circuits of one or more of the stages of radio-frequency amplifier 40, oscillator-modulator 43 and intermediate-frequency amplifier 44 in a well known manner.

An additional intermediate-frequency amplifier 51 for sound signals is also coupled to the output circuit of oscillator-modulator 43. Coupled in cascade to the output circuit of intermediate-frequency amplifier 51 are frequency detector 13', audio-frequency amplifier 14 and sound-signal reproducer 15.

In addition, there is coupled to the output circuit of line-scanning generator 50 a harmonic-frequency generator 52, the output of which is in turn coupled through winding 32 to the resonant circuit 21, 22 in frequency detector 13'.

It is understood that the various units thus far described with the exception of the frequency-detector 13' may have any conventional construction or design. The details of such components are well known in the art rendering a further description thereof unnecessary.

Considering briefly the operation of the television receiver as a whole and assuming for the moment that detector 13' is conventional, a desired modulated carrier-wave television system is intercepted by antenna system 41, 42. The signal is selected and amplified in radio-frequency amplifier 40 and applied to oscillator-modulator 43 wherein it is converted into an intermediate-frequency signal. The intermediate-frequency signal is selectively amplified in amplifier 44 and supplied to detector 45 where the video-modulation components of the applied signal are derived. These components which comprise video frequency as well as synchronizing-signal components are amplified in video-frequency amplifier 46 and applied to image reproducer 47. The synchronizing-signal components are separated from the video-frequency signal in the synchronizing-signal separator 48 and used to synchronize the operation of the field- and line-scanning generators 49 and 50, respectively. Conventionally, these generators supply scanning signals of sawtooth wave form, properly synchronized with reference to the received television signal, to the image reproducer to effect scanning therein and reproduction of the television image. In the present embodiment, line-scanning generator 50 also supplies line-frequency signals to harmonic frequency generator 52 wherein a harmonic of the line-frequency signals is selectively amplified.

The automatic-gain-control or A. G. C. signal derived in detector 45 is effective to control the amplification over one or more of units 40, 43 and 44 to maintain the signal input to detector 45 and to intermediate-frequency amplifier 51 within a relatively narrow range for a wide range of received signal intensities.

The sound-signal modulated carrier wave accompanying the desired television-modulated carrier wave is conventionally of the frequency-modulated type and is also intercepted by antenna system 41, 42. After selective amplification in radio-frequency amplifier 40, the sound-signal modulated carrier wave is applied to oscillator-modulator 43 and converted to a sound-modulated intermediate-frequency signal of the frequency-modulation type. The sound-modulated intermediate-frequency signal is applied to intermediate-frequency amplifier 51 wherein it is amplified, the amplified signal being then supplied to detector 13' to derive the sound-signal modulation components. The derived signal is then applied to the audio-frequency amplifier 14 for further amplification and is then reproduced by sound-reproducing device 15.

*Description of frequency detector of Fig. 7*

Referring now more particularly to the frequency detector 13', the circuit arrangement of this detector is similar to the arrangement of detector 13 of Fig. 1 except for the manner in which the source of other wave signals is generated and applied to network 17. As has been related above, the harmonic frequency generator 52 generates signals which are a multiple harmonic of line-frequency signals, preferably being of the order of the fourth or a higher harmonic having a frequency of the order of 60,000 to 100,000 cycles. These signals are applied to network 17 through inductively coupled windings 32, 22, and are then utilized in detector 13' in the same manner as the signals from the source 31 were used in the detector 13 previously described.

While there have been described what are at present considered to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. A system for deriving the modulation components of a frequency-modulated wave signal comprising: means for supplying said frequency-modulated wave signal; means comprising an impedance network including in series an impedance circuit and a unidirectionally conductive device coupled to said supply circuit for causing the impedance of said network to vary with the frequency of said frequency-modulated signal; means including a signal generator for developing an unmodulated other wave signal the frequency of which is a minor fraction of the mean frequency of said frequency-modulated signal; means including a load circuit coupled to said generator and responsive to said other wave signal and effectively coupled in shunt with said network for utilizing said variations in the impedance of said network to effect amplitude modulation of said other wave signal in said load circuit corresponding to said frequency-modulation of said supplied signal; and means including an amplitude detector coupled to said load circuit for deriving the modulation components of said amplitude-modulated other wave signal.

2. A system for deriving the modulation components of a frequency-modulated wave signal comprising: means for supplying said frequency-modulated wave signal; means comprising an impedance network including in series a unidirectionally conductive device and a parallel-resonant circuit side-tuned to the mean frequency of said wave signal and coupled to said supply circuit for causing the impedance of said network to vary with the frequency of said frequency-modulated signal; means including a signal generator for developing an unmodulated other wave signal the frequency of which is a minor fraction of the mean frequency of said frequency-modulated signal; means including a load circuit coupled to said generator and responsive to said other wave signal and effectively coupled in shunt with said network for utilizing said variations in the impedance of said network to effect amplitude modulation of said other wave signal in said load circuit corresponding to said frequency-modulation of said supplied signal; and means including an amplitude detector coupled to said load circuit for deriving the modulation components of said amplitude-modulated other wave signal.

3. A system for deriving the modulation components of a frequency-modulated wave signal comprising: means for supplying said frequency-modulated wave signal; means comprising an impedance network including in series a parallel-resonant circuit and a diode rectifier coupled to said supply circuit, said resonant circuit being side-tuned to the mean frequency of said supplied signal for causing the impedance of said network to vary with the frequency of said frequency-modulated signal; means including a signal generator for developing an unmodulated other wave signal the frequency of which is a minor fraction of the mean frequency of said frequency-modulated signal; means including a load circuit coupled to said generator and responsive to said other wave signal and effectively coupled in shunt with said network for utilizing said variations in the impedance of said network to effect amplitude modulation of said other wave signal in said load circuit corresponding to said frequency-modulation of said supplied signal; and means including an amplitude detector coupled to said load circuit for deriving the modulation components of said amplitude-modulated other wave signal.

4. A system for deriving the modulation components of a frequency-modulated wave signal comprising: means for supplying said frequency-modulated wave signal; means comprising an impedance network including in series an impedance circuit and a unidirectionally conductive device coupled to said supply circuit for causing the impedance of said network to vary with the frequency of said frequency-modulated signal; means including a signal generator for developing an unmodulated other wave signal the frequency of which is a minor fraction of the mean frequency of said frequency-modulated signal; means including a load circuit including a tuned circuit coupled to said generator and resonant at the frequency of said other wave signal, said load circuit being effectively coupled in shunt with said network for utilizing said variations in the impedance of said network to effect amplitude modulation of said other wave signal in said load circuit corresponding to said frequency-modulation of said supplied signal; and means including an amplitude detector coupled to said load circuit for deriving the modulation components of said amplitude-modulated other wave signal.

5. A system for deriving the modulation components of a frequency-modulated wave signal comprising: means for supplying said frequency-modulated wave signal; means comprising an impedance network including in series a parallel-resonant circuit and a diode rectifier coupled to said supply circuit, said resonant circuit being side-tuned to the mean frequency of said supplied signal for causing the impedance of said network to vary with the frequency of said frequency-modulated signal; means including a signal generator for developing an unmodulated other wave signal the frequency of which is a minor fraction of the mean frequency of said frequency-modulated signal; means including a load circuit including a tuned circuit coupled to said generator and resonant at the frequency of said other wave signal, said load circuit effectively coupled in shunt with said network for utilizing said variations in the impedance of said network to effect amplitude modulation of said other wave signal in said load circuit corresponding to said frequency-modulation of said supplied signal; and means including an amplitude detector coupled to said load circuit for deriving the modulation components of said amplitude-modulated other wave signal.

6. A system for deriving the modulation components of a frequency-modulated wave signal comprising: means for supplying said frequency-modulated wave signal; means comprising an impedance network including in series for unidirectional currents an impedance circuit and a unidirectionally conductive device coupled to said supply circuit for causing the impedance of said network to vary with the frequency of said frequency-modulated signal; means including a signal generator for developing an unmodulated other wave signal the frequency of which is a minor fraction of the mean frequency of said frequency-modulated signal; means including a load circuit coupled to said generator and responsive to said other wave signal and effectively coupled in shunt with said network for said unidirectional currents for utilizing said variations in the impedance of said network to effect amplitude modulation of said other wave signal in said load circuit corresponding to said frequency modulation of said supplied signal; and means including an amplitude detector capacitively coupled to said load circuit for deriving the modulation components of said amplitude-modulated other wave signal.

7. A system for deriving the modulation components of a frequency-modulated wave signal in a television apparatus comprising: means for supplying said frequency-modulated wave signal; means comprising an impedance network including in series an impedance circuit and a unidirectionally conductive device coupled to said supply circuit for causing the impedance of said network to vary with the frequency of said frequency-modulated signal; means including a signal generator for developing an unmodulated other wave signal at a harmonic of line frequency; means including a load circuit coupled to said generator and responsive to said other wave signal and effectively coupled in shunt with said network for utilizing said variations in the impedance of said network to effect amplitude modulation of said other wave signal in said load circuit corresponding to said frequency-modulation of said supplied signal; and means including an amplitude detector coupled to said load circuit for deriving the modulation components of said amplitude-modulated other wave signal.

8. A system for deriving the modulation components of a frequency-modulated wave signal in a television apparatus comprising: means for supplying said frequency-modulated wave signal; means comprising an impedance network including in series an impedance circuit and a unidirectionally conductive device coupled to said supply circuit for causing the impedance of said network to vary with the frequency of said frequency-modulated signal; means including a line-frequency generator for developing scanning wave signals; means including a harmonic amplifier coupled to said generator for developing an unmodulated other wave signal having a frequency in the range of 60 to 100 kilocycles; means including a load circuit coupled to said harmonic amplifier and responsive to said other wave signal and effectively coupled in shunt with said network for utilizing said variations in the impedance of said network to effect amplitude modulation of said other wave signal in said load circuit corresponding to said frequency modulation of said supplied signal; and means including an amplitude detector coupled to said load circuit for deriving the modulation components of said amplitude-modulated other wave signal.

References Cited in the file of this patent

UNITED STATES PATENTS

| | | |
|---|---|---|
| 2,248,442 | Stocker | July 8, 1941 |
| 2,422,079 | Carlson | June 10, 1947 |
| 2,462,759 | McCoy | Feb. 22, 1949 |
| 2,494,795 | Bradley | Jan. 17, 1950 |
| 2,513,731 | Loughlin | July 4, 1950 |

OTHER REFERENCES

Hings and Garstang: "Noise Neutralizing Detector Circuit," Tele-Tech, January 1948, pp. 40–41.